United States Patent
Wagner

(10) Patent No.: US 12,384,395 B2
(45) Date of Patent: Aug. 12, 2025

(54) METHOD FOR OPERATING AN OPERATING SYSTEM IN A VEHICLE AND OPERATING SYSTEM FOR A VEHICLE

(71) Applicant: Volkswagen Aktiengesellschaft, Wolfsburg (DE)

(72) Inventor: Volkmar Wagner, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 201 days.

(21) Appl. No.: 17/776,165

(22) PCT Filed: Oct. 26, 2020

(86) PCT No.: PCT/EP2020/080082
§ 371 (c)(1),
(2) Date: May 11, 2022

(87) PCT Pub. No.: WO2021/099068
PCT Pub. Date: May 27, 2021

(65) Prior Publication Data
US 2022/0396284 A1 Dec. 15, 2022

(30) Foreign Application Priority Data
Nov. 18, 2019 (DE) .......................... 102019217730.1

(51) Int. Cl.
*B60W 50/00* (2006.01)
*B60W 50/10* (2012.01)
*B60W 50/14* (2020.01)

(52) U.S. Cl.
CPC ............ *B60W 50/14* (2013.01); *B60W 50/10* (2013.01); *B60W 2050/146* (2013.01)

(58) Field of Classification Search
CPC ................ B60W 50/14; B60W 50/10; B60W 2050/146; G06Q 10/107
See application file for complete search history.

(56) References Cited

U.S. PATENT DOCUMENTS

| | | | |
|---|---|---|---|
| 11,036,346 B2 | 6/2021 | Kuhn et al. | |
| 2014/0057610 A1* | 2/2014 | Olincy | H04W 4/16 455/414.1 |

(Continued)

FOREIGN PATENT DOCUMENTS

| | | |
|---|---|---|
| CN | 105313694 A | 2/2016 |
| CN | 109923508 A | 6/2019 |

(Continued)

OTHER PUBLICATIONS

PCT/EP2020/080082. International Search Report (Nov. 30, 2020).

(Continued)

*Primary Examiner* — Ian Jen
(74) *Attorney, Agent, or Firm* — Peter Zura; LOZA & LOZA, LLP

(57) ABSTRACT

Technologies and techniques for operating an operating system in a vehicle, in which display data for a graphical user interface having a first display region and an info region is generated and output. Context data relating to a current context of the vehicle is detected. A first relevance value is determined for a first info application on the basis of the detected context data, and a graphical info object is generated according to the determined first relevance value on the basis of the first info application and output in the info region. The position and/or size of the graphical info object is formed according to the first relevance value. The present disclosure also relates to an operating system for a vehicle, including a control unit, an output unit and a context detection unit.

20 Claims, 11 Drawing Sheets

(56) References Cited

U.S. PATENT DOCUMENTS

| | | |
|---|---|---|
| 2014/0303839 A1 | 10/2014 | Filev et al. |
| 2014/0304635 A1 | 10/2014 | Kristinsson et al. |
| 2015/0178034 A1* | 6/2015 | Penilla .................. H04L 67/303 |
| | | 345/1.1 |
| 2015/0332205 A1* | 11/2015 | Gauthier ............ G06Q 10/1093 |
| | | 705/7.17 |
| 2015/0367730 A1* | 12/2015 | Wagner ..................... G06T 1/20 |
| | | 701/36 |
| 2018/0321053 A1* | 11/2018 | Stahl .................. G01C 21/3697 |
| 2020/0058150 A1* | 2/2020 | Kuhn ................... G06F 3/0482 |

FOREIGN PATENT DOCUMENTS

| | | |
|---|---|---|
| DE | 102006017855 A1 | 11/2007 |
| DE | 102009057082 A1 | 6/2011 |
| DE | 102011116120 A1 | 4/2013 |
| DE | 102016121561 A1 | 5/2018 |
| EP | 2930603 A1 | 10/2015 |
| EP | 3192692 A1 | 7/2017 |
| WO | 2018086826 A1 | 5/2018 |

OTHER PUBLICATIONS

EP102019217730.1. Examination Report (Sep. 4, 2020).
Corresponding Chinese Application No. 202080079923.4. Office Action (May 31, 2024).

* cited by examiner

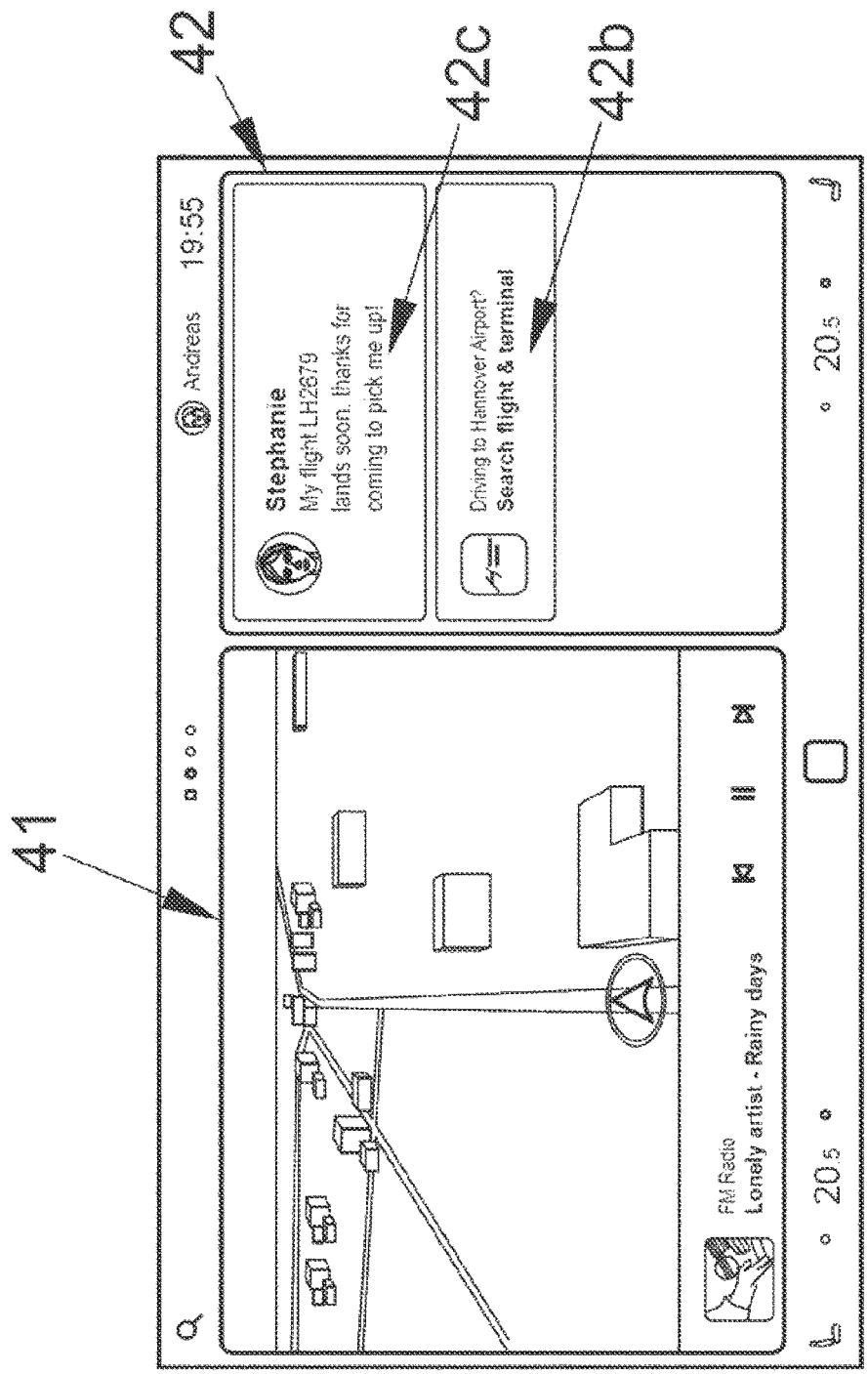

METHOD FOR OPERATING AN OPERATING SYSTEM IN A VEHICLE AND OPERATING SYSTEM FOR A VEHICLE

RELATED APPLICATIONS

The present application claims priority to International Patent App. No. PCT/EP2020/080082 to Volkmar Wagner, titled "Method for Operating An Operating System In A Vehicle And Operating System For A Vehicle", filed Oct. 26, 2020, which claims priority to German Patent App. No. 10 2019 217 730.1, filed on Nov. 18, 2019, the contents of each being incorporated by reference in their entirety herein.

TECHNICAL FIELD

The present disclosure relates to technologies and techniques for operating an operating system in a vehicle and to an operating system for a vehicle.

BACKGROUND

The increasing availability of information from a wide variety of sources, such as that provided by the internet, presents the user of a modern electronic operating system with new challenges. In the context of automobility, too, a trend towards increasing integration of data that is provided not only by the vehicle itself but also by external devices can be seen. For example, driver assistants, additionally offered services, messaging services, social media, news services and other offers from third-party providers provide data and notifications that, despite their diversity and varying relevance, are to be detected and processed by the user. Other possible services that are provided as online services, for example, relate to the management of parking spaces, the loading and unloading of vehicles, vehicle services and other offerings.

The large amount of incoming information is sometimes modeled as a dynamic "stream" of data, or "feed". However, no solutions are known for outputting such a stream that are specifically designed for the needs in a vehicle. It is of particular importance here that the user, in particular the driver of the vehicle, can focus his attention only to a limited extent on the operating system, since driving the vehicle and observing the traffic environment require his full attention.

SUMMARY

Aspects of the present disclosure are directed to providing a method and an operating system of the type mentioned at the outset, in which the user is given simple and quick access to relevant information.

Aspects of the present disclosure are disclosed in the various features, alone or in combination, recited in the independent claims. Further aspects and configurations are disclosed in the features recited in the dependent claims.

In some examples, a method is disclosed, wherein display data of a graphical user interface with a first display area and an info ("information" or "informational") area are generated and output. Context data about a current context of the vehicle are detected and a first relevance value for a first info application is determined on the basis of the detected context data. Depending on the determined first relevance value, a graphical info object is generated based on the first info application and output in the info area, the arrangement and/or size of the graphical info object being designed as a function of the first relevance value.

In this way, relevant contents can advantageously be output in a particularly simple and clearly understandable manner. The user can thus easily recognize when new relevant information is provided and, for example, an operation is required. At the same time, the space available in the vehicle for displaying graphic data is optimally used and flexibly adapted.

In some examples, the user interface is output on a display surface that may be permanently attached in the vehicle, for example on a display surface of a center display in the area of a center console or a dashboard of the vehicle. In further embodiments of the present disclosure, the output can alternatively or additionally take place in an instrument cluster of the vehicle or by means of an output unit from the area of augmented reality ("virtual reality"), for example in a field of view display (head-up display). In a further embodiment, the display can also take place on a display surface of a mobile user device, for example a cell phone or tablet computer, which is located in the vehicle and is detachably coupled to the vehicle, for example by means of a data connection.

The graphical user interface is designed in a manner known per se. In some examples, the graphical user interface may include a graphic representation for a human-machine interface. Technical devices can be operated by means of control elements, for which purpose buttons or symbols of the display can be used. In particular, the user interface can include switching and operating elements which represent the operation of a functionality in a manner that can be grasped by a person. For example, the amount of a parameter can be represented and its setting can be visualized by a setting element. The user interface can further include elements for displaying information and thus enable an output that can be interpreted by a person.

The graphical user interface can be configured to have a basic state that is defined in such a way that no info area is provided in this state. This does not rule out that information is also output in the first display area; however, no graphic object is included that has the specific properties of the info area in which the graphical info object is represented in the present disclosure. In particular, no info objects are displayed dynamically in the initial state, as described below. Conversely, the graphical user interface can also have an info state in which an info area is designed in which the info object can be output.

For example, starting from the basic state, the info state can be activated depending on the first relevance value, for example when the relevance value exceeds a relevance threshold value. In the case of a transition from the basic state to the info state, it can be provided that the first display area be reduced in size in order to create space within the graphical user interface in which the info area with the graphical info object is then output.

In some examples, the detected context data may include features of the vehicle, an operating state of the vehicle, features of a trip by a user with the vehicle and/or user data of the user. The context data are advantageously detected particularly strongly related to the vehicle and the trip or the operation of the vehicle. In this way, a particularly intelligent response or system reaction to a constantly changing context of the vehicle can be formed.

In contrast to other methods in which, for example, newly arriving messages are to be output on a user interface, in the present disclosure the relevance value for the first info application is determined with reference to the vehicle or to the context of the vehicle. As a result, the output of the info object or the activation of the info state in the method is particularly strongly geared towards the needs of the user in the vehicle, in particular the driver of the vehicle.

In some examples, a control system for a vehicle is disclosed, comprising a control unit that is set up to generate display data of a graphical user interface with a first display area and an info area, an output unit which is set up to output the display data, and a context detection unit which is set up to detect context data about a current context of the vehicle. The control unit is also set up to determine a first relevance value for a first info application based on the context data detected and, depending on the determined first relevance value, a graphical info object based on the first info application to generate and output in the info area, the arrangement and/or size of the graphical info object being designed depending on the first relevance value.

The operating system according to the present disclosure is designed in particular to be operated by means of the method according to the invention described above. The operating system thus has the same advantages as the method according to the invention.

BRIEF DESCRIPTION OF THE DRAWINGS

Aspects of the present disclosure will now be explained on the basis of exemplary embodiments with reference to the drawings.

FIGS. 4A to 4G show other exemplary embodiments of displays which can be generated by the operating system, under some aspects of the present disclosure.

DETAILED DESCRIPTION

Figure 1:
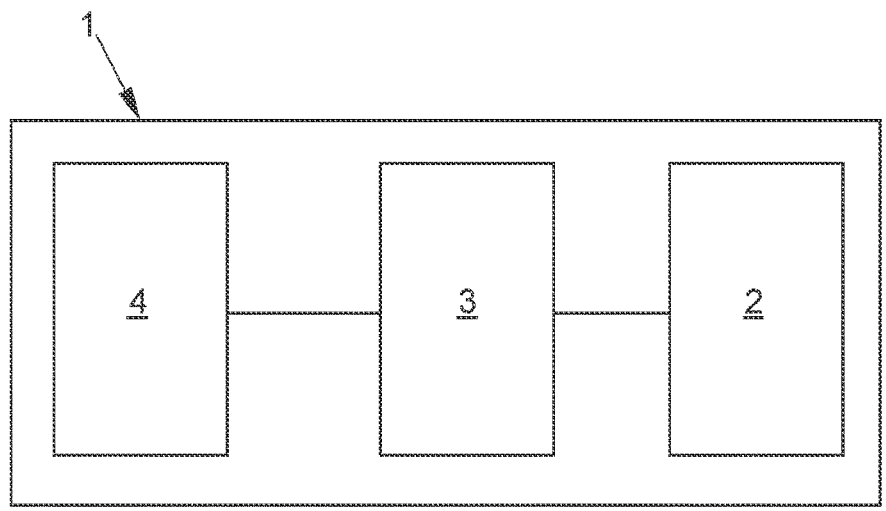
FIG. 1 shows a vehicle with an exemplary embodiment of the operating system according to some aspects of the present disclosure.

As discussed in the present disclosure, context data can relate to a wide variety of areas in the use of the vehicle. The features of the vehicle may include fixed parameters, such as dimensions, or variable sizes, such as the opening states of doors and windows and the occupancy of the vehicle by passengers. Furthermore, a charging state, a remaining energy reserve, a range, possibly technical problems or vehicle-related stops can be included. Moreover, a driving or parked state can be such a feature. The operating state of the vehicle can relate, for example, to driving or the standstill of the vehicle; information about a speed and/or acceleration as well as states of driver assistance systems can also be included. The context data relating to a trip of the vehicle can concern environmental data that can be detected by sensors of the vehicle or are retrieved from an external source, for example information about a position of the vehicle and its surroundings, vehicles and objects in the surroundings of the vehicle, about traffic equipment, weather conditions or special destinations in the surrounding area. Context data can also include traffic data, congestion data or other information about traffic states as well as traffic warnings. Context data can also include settings and/or states of a navigation system, for example a destination of a route or a planned route, and the duration of the planned route can also be taken into account. Further features can be types of trips, such as commute to work, weekend trip or vacation trip, the distinction between simple trips or trips with a planned return trip. The user data can include different personalized data, for example an identity of the driver, front seat passenger or other passengers. Furthermore, data from an electronic calendar or organizer, contact data, information relating to telecommunications can be included, for example with text messages or voice connections; furthermore, physiological data, for example on fatigue or a stress level as well as special needs of a driver or passenger, can be included, and data on habits or preferences can be detected on the basis of a usage history or evaluated by a learning algorithm. Context data can further concern a time of day or time as well as a distinction between weekdays and weekends.

The context data may be detected in a manner known per se, for example, by means of sensors of the vehicle or on the basis of a data connection to an external unit through which the detection takes place. The context data can further be retrieved from a storage unit which is provided, for example, in the vehicle or at an external device.

In some examples, continuous detecting and updating of the context data is provided and the method is carried out iteratively on the basis of the respective current context data. This means that the first relevance value for the first info application can be continuously re-evaluated and the representation of the info object can be adapted accordingly. This allows changing conditions and newly occurring information, for example newly arriving messages or newly occurring events, to be taken into account.

The first info application may be configured as a computer program. It can relate to various functionalities for which information is to be output to a user in the vehicle and/or interaction options are to be created. An info application within the meaning of the invention can in principle relate to all applications in which a display can be generated for the user of the vehicle.

In some examples, the info application may relate to messages or notifications, in particular from external units or external communication partners. It can further relate to additional content that is output in addition to the data output in the first display area. For example, the user can configure the content in the first display area himself, for example by manually calling up or closing an application in the vehicle or by activating or deactivating functionalities that are associated with a certain information output and/or display of operating options on the display area. In contrast, the info objects output in the info area are automatically generated depending on their relevance for the respective context of the vehicle in such a way that particularly relevant content is output to the user from a constantly dynamic and changing stream of data.

The first relevance value can be determined in a manner known per se. In particular, a specific absolute or relative numerical value may be assigned to the first info application at a specific point in time. In particular, the relevance value evaluates the relevance of the info application relative to other info applications or the relevance for a specific user is determined absolutely. Weighting parameters can be provided with the aid of which the relevance of certain info applications can be determined as a function of the context data, with current program states and/or program events in particular being taken into account.

For example, info applications can be assigned categories for which specific weighting parameters are determined on the basis of the context data. For example, the relevance values of info applications that relate to the drivability of a route can be rated as particularly relevant, while the context data is used to determine ongoing navigation of the vehicle, in particular if the information about drivability relates to a specifically planned route. Furthermore, info applications, which relate to direct telecommunication between the user and another user, be assigned to a category with particularly high relevance, for example to display an incoming call with a high priority using a corresponding info application and to enable the user to accept or answer directly.

In some examples, the first display area and the info area may be configured as windows or widgets within the graphical user interface. In particular, a widget takes up the entire info area. In some examples, the graphical info object may be configured as a sub-widget or sub-window that is subordinate to the info area. The graphical object can therefore be designed as a sub-widget within an information area designed as a widget.

In this sense, "windows" should be understood to be limited areas of the graphical user interface in which data provided by an assigned application program is output. In particular, all graphically output data of an instance of the assigned application program are only output in the window. A "widget" in this sense is in particular a program integrated into the graphical user interface, that is, the program is executed when the widget is output in the graphical user interface. Furthermore, other configurations for displaying contents in certain areas of the graphical user interface can be used in an analogous manner. Sub-widgets are widgets subordinated to another widget. In particular, they are arranged within a surface assigned to the superordinate widget within the graphical user interface.

In some examples, info objects can be designed as "feed cards". This may be understood to mean areas of the display that may, for example, be designed in the manner of the known display areas, tabs, windows or widgets in which relevant information is output or operating options are provided at a point in time or during a period of time. A feed card can also be arranged as an info object within other display areas, windows, widgets or objects and is assigned to a specific info application as an information source or operating target for which the relevant data is output.

The info object, for example a feed card, may include text elements that can also be configured as hyperlinks, or can be operated in some other way, and/or a graphic symbol, on the basis of which a user can, for example, detect the assigned info application. Furthermore, fixed sizes and design templates can be provided for the info object, for example a single or multi-line design, smaller and larger dimensions for which certain levels are defined, defined areas for text and/or image elements and specifications for color and/or typographic design.

In some examples, the arrangement and/or size of the graphical info object may be configured depending on the first relevance value. The info object can, for example, be displayed larger the higher the assigned relevance value is. It can furthermore be arranged closer to a specific position within the info area, for example, the closer to an edge of the info area, the greater the relevance value. Conversely, the info object can be arranged closer to another position, for example closer to an opposite edge of the info area, the lower the relevance value. On the basis of the relevance values for different info applications, a ranking of several info objects can also be determined, in which case the info objects in the info area are displayed one below the other or next to one another in a specific order. Further properties of the display of the info objects can also be formed on the basis of the relevance value, for example graphic parameters such as color, saturation, transparency or contrast. For example, info objects to which a low relevance value is assigned, in particular if a relevance threshold value is not reached, can be displayed in a certain way, for example grayed out or less clearly perceptible in another way than info objects with a higher relevance value.

In some examples, the graphical info object itself can also be designed as a widget, namely a program that can generate information output or provide operable elements. It can also be designed as a sub-widget subordinate to a further widget and, in particular, be assigned to a single instance of an info application. The widget can also detect inputs and generate corresponding control signals for other devices and/or programs.

In some examples, the first relevance value may be compared with a relevance threshold value, and the graphical info object is generated when the first relevance value exceeds the relevance threshold value. In particular, the info area is generated only when an info application has a relevance value that exceeds the relevance threshold value. This ensures that info objects are output only if their relevance exceeds a certain minimum value.

In this case, the relevance value can be designed as a function of time, that is to say, it changes as a function of time. The first info application can therefore have a different relevance at a certain point in time than at another point in time. Furthermore, a period of time can be determined which is assigned to the output of the first info object. This means that the info object is output for a certain period of time and can then be hidden again, for example if another info object is to be output. It can also be hidden after the time period has elapsed or its output can be ended in some other way and the info object or the first info area can disappear again from the display, in particular by enlarging the first display area again and then, for example, over the surface of the first information area.

In some examples, the graphical info object relates to an incoming message from a telecommunication system, that is to say in particular a text message received from a telecommunication partner, and comprises at least one automatic response option. The automatic response option can be selected by an operator action. After the selection, a response for the telecommunications partner is generated and sent, in particular using the automatic response option. The automatic response option is formed in particular depending on the detected context data, for example by means of artificial intelligence or machine learning. This advantageously enables the user to react to the message quickly and in a way that is adapted to the context.

For example, the system receives a text message with a request from the telecommunication partner. The answer option, possibly a selection of several answer options, is generated automatically and displayed to the user. This is done in particular on the basis of the detected context data. A response option is selected by an operator action and a corresponding response is automatically sent to the telecommunications partner.

In a further embodiment, the graphical info object relates to a scheduling conflict and includes at least one automatic notification option. The automatic notification option can be selected by an operator action. After the selection, a notification for a telecommunications partner is generated and sent, in particular using the automatic notification option. The automatic notification option is formed particularly dependent on the detected context data formed, for example by means of artificial intelligence or machine learning. In this way, a relevant notification can advantageously be generated particularly quickly if a scheduling conflict occurs due to a changed context of the vehicle, for example in the event of traffic obstructions.

For example, it is detected that a delay in the trip means that a date determined on the basis of scheduling data cannot be kept. A contact person is determined on the basis of the scheduling data, which are included in the context data here, and a notification is generated. These notification options, possibly a selection of several notification options, are displayed to the user. A notification option selected on the basis of an operator action is used to generate a notification and this is sent to the contact person.

If a transition from a basic state to an info state of the graphical user interface is provided, then in particular the first display area can be reduced and this frees up an info area in which the graphical info object for the first info application is then output. This transition can be displayed in different ways known per se: For example, when reducing the size of the first display area, an image sequence is generated in such a way that a shifting of at least one edge of the first display area is represented. In particular, a shift of the entire first display area can alternatively or additionally be displayed. The output is thereby advantageously carried out in such a way that the transition from the basic state to the info access can be grasped particularly quickly and intuitively by the user through an animated display.

For example, a side edge of the first display area is shifted so that it is reduced in the process. The information area, which is now arranged laterally next to the first display area, is formed in the free area formed in the process. This process takes place in particular by an animated reduction in size of the display area. That is, in the method, in particular the first display area is not covered by the contents of the graphical info object, as would be the case, for example, with the known display of a popup. Instead, the display within the graphical user interface is changed in such a way that a free info area is created and the graphical info object is arranged there.

In some examples, the graphical user interface may also include a second display area, which is arranged adjacent to the first display area in the basic state of the graphical user interface. The info area is displayed when the Info state formed between the first and the second display area is activated. The info area can thereby advantageously be inserted between several display areas.

The display areas can be limited by a displayed border, but they can also include a virtual border. Adjacent display areas can be displayed with a space between their edges, although it is assumed that they are adjacent as long as no further objects are or can be arranged between the display areas.

In different embodiments, the sizes of the two display areas between which the info area is formed can change, in particular by moving the first and second display areas apart, with the second display area also being able to be reduced if necessary. Furthermore, the edges of the display areas adjoining one another in the basic state can be shifted away from one another. On the other hand, the reduction can be carried out only for one display area while the other display area is represented as it is. Furthermore, the arrangement of the display areas can be adjusted by moving them.

In some examples, when the graphical info object is output in the info area, an image sequence is generated in such a way that a shifting of the graphical info object is displayed. As a result, the presence of new relevant information and/or operating options can advantageously be output in a manner that is particularly easy to grasp for the user.

For example, the graphical info object is shifted from an edge of the info area into the info area with a movement. In particular, an animation is output, that is, a sequence of images which gives the impression of a continuously moving info object. In this way, it can advantageously be shown that the graphical info object is moved from the outside into the user interface. In particular, the graphical info object appears because it is shown falling or pushed into the info area.

Furthermore, the info object can be displayed with a continuously increasing intensity, brightness, contrast or size or appear in another way within the graphical user interface. By shifting the graphical info object, it is also possible to rearrange a number of info objects that are shown, for example, as sub-widgets within a superordinate widget or window. Conversely, info objects can disappear in an analogous manner, for example if their relevance value falls below a certain threshold, for example by moving it out of the info area or by hiding it. In other embodiments, other known ways of graphic representation can be used to make the info object appear in the info area. The info object can, for example, be displayed with a changing brightness or another display parameter, it can be formed by enlarging or reducing as well as by other effects to appear within the display.

In some examples, the info object may be configured to disappear or be hidden from the user interface. This can take place, for example, if another info object is to be displayed for an info application with a higher relevance or if the relevance value of the first info application no longer exceeds a certain threshold value. A disappearance can be shown, for example, in such a way that the info object is shifted out of the info area. In particular, the representation of the movement points in the same direction as when the info object appeared. For example, the info object with a higher relevance value first "falls" into the info area from above and later, when the relevance value is lower and another info object is to be displayed, it "falls" downwards to once again free up the info area. Similarly, if the info object was initially "pushed" from one side into the info area, it can later be "pushed out" to the opposite side.

In some examples, exactly one info object can be completely represented in the info area. In particular, when there is a change between different info objects, for example if the first graphical info object is replaced by a second info object, both info objects are partially displayed. In other embodiments, several info objects can be displayed in the info area at the same time, the arrangement and/or configuration of the information objects relative to one another being determined in particular on the basis of the respective current relevance values.

In some examples, at least one further graphical info object is output in the info area, the first and the other info object being arranged in a sequence determined by their respective relevance value, for example next to one another or one below the other.

A second relevance value of a second info application may be determined and a second graphical info object is generated on the basis of the second info application. The second graphical info object is output in the info area, a sequence and/or a display duration for the first and the second info object being determined depending on a comparison of the first and second relevance values. As a result, several info objects can advantageously be output, in particular in a specific sequence one after the other and/or for a specific time period in each case.

The info object that is assigned to the info application with the higher relevance value may be displayed first according to the sequence or according to the display duration for a longer period of time. The relevance values are determined on the basis of the context data, current context data in particular being taken into account. This means that the relevance values can change when the context data are updated and a changed sequence or a changed display duration for the info objects can result.

Furthermore, a dynamic rearrangement of the displayed info objects can be output, using an animation in which a movement of an info object to a different position within the displayed row of info objects is output.

In some examples, the first or second info object is arranged in such a way that a subset of the info objects can be represented in the info area. The subset of the info objects represented can be changed by an operator action. In particular, a real subset of a set of representable info objects is displayed, that is, not all representable info objects are visible at the same time. As a result, a larger number of info objects can advantageously be displayed and managed.

For example, an info object can be displaced by other info objects with currently higher relevance, for example, if it concerns a context that is no longer current. A history of the info objects represented can then be accessed through the operator action. In one example, the info objects are displayed one below the other, the info object with the highest relevance according to the current relevance values being arranged at the upper or lower end. If a higher relevance is now determined for another info object, then this displaces the previously most relevant info object and is arranged at the upper or lower end, the info object previously arranged there being is shifted to the next, subordinate position. Furthermore, the sequence of the output info objects can be redefined and the info objects are re-sorted accordingly. In particular, less relevant info objects are not removed, but their relevance values are reduced in such a way that they slide further back in the row of the displayed info objects.

If the number of info objects that can be displayed in the info area is exceeded, then some of the info objects are no longer represented, but can be retrieved only by a specific operating action by which the subset represented is changed, for example by moving a bar, by a swiping gesture or by actuating a operating element.

In some examples, the first and second graphical info object are displayed one after the other, the first graphical info object being displayed first and then the second info object being displayed instead of the first info object, the first or second info object being displayable by an operator action. As a result, a history of the info objects represented can advantageously be retrieved.

For example, the info objects are displayed by moving them from an edge of the info area into the info area. If another info object is displayed, the one that is already displayed can be replaced by the new info object. For example, info objects are pushed into the info area from above or they "fall" into the info area. Other info objects that are to be displayed in the info area also come from above, while previously displayed info objects are shifted down or "fall out of the info area". Similarly, a lateral shift can be represented or a new info object can be shifted from a lower edge up to the position at which it is ultimately to be displayed.

Furthermore, several info objects can be displayed at the same time, a representable set of info objects being defined, of which a subset of the set of info objects is displayed at the same time; this subset can also contain exactly one info object.

The operating action for displaying the first or second info object includes, for example, a swiping gesture by means of which a row of info objects represented is shifted so that the currently output subset of the info objects is changed.

For example, the fall of the info object into the info area is represented, whereby a new info object displaces a previously represented one downwards. The representation takes place in such a way that the currently and previously represented info objects are arranged along a virtual band, which can be shifted in a vertical direction by a swiping gesture.

In this case, previously represented info objects, if they are again represented by the operator action, can be designed in a different way. In particular, the assigned relevance value can change and an info object can be marked as obsolete if it falls below a relevance threshold value. This can take place in different ways in a manner known per se, for example by means of a grayed-out representation with lower color saturation, brightness or reduced contrast.

Furthermore, it can be provided that in the case of obsolete info objects, a previously given operability is no longer possible or possible only to a limited extent.

In some examples, the graphical information object may include an operating element, an actuation of the operating element is detected and an additional information area is formed in which an additional graphical information object is output. In this way, additional areas can advantageously be used in order to output further information on the currently displayed info object or on the info application assigned to it and/or to allow further operability.

Here the additional info object is output outside of the info area. It can cover other areas, for example, in the manner of a popup, an additional window or widget or as an extension of a window or widget represented in the info area.

The additional info object can also be displayed in such a way that it takes up another display area of the graphical user interface, in particular the first or second display area described above, and possibly replaces previously displayed content. For example, the info object is represented in the info area and—possibly after an operating action such as tapping or other actuation in the area of the info object—a display area arranged in particular adjacent to it is replaced by a display of the additional info object belonging to the info application.

If such a replacement of the contents of a further display area is provided, it can also be provided that a priority value to be assigned to each of the display areas of the graphical user interface. Depending on this priority value and the relevance value for the respective info object, it can be determined whether a content of a display area may be replaced by the additional info object or in which display area of the graphical user interface such a replacement is carried out. This means that if, for example, an additional info object is to be represented, in the area of the info object, the priority value of an adjacent display area can be used to determine whether the content of this display area may be replaced by the additional info object. The relevance value for the info application for the additional info object may also be taken into account.

The additional info object can be represented together with the info object in the info area and, together with this, removed from the display after a certain period of time or after an operating action has been detected. It can also be stored in a history, similar to that described above for the info objects, and called up again by an operator action.

In some examples, the info area can further be removed again from the graphical user interface following the output of the info object, the first display area enlarging again. In particular, this closes a gap that was previously created by reducing the size of the first display area. For example, the info object disappears after a certain display duration or after a certain operating action by the user, or the relevance value of the assigned info application becomes lower, so that it falls below a relevance threshold value, for example, and the associated info object should no longer be represented.

Turning to FIG. 1, a vehicle is illustrated with an exemplary embodiment of the operating system according to some aspects of the present disclosure.

In this example, the vehicle 1 includes an output unit 2, which is designed as a display 2 in the exemplary embodiment. The display 2 is coupled to a control unit 3 of the vehicle 1. The vehicle 1 further comprises a context detection unit 4, which in the exemplary embodiment includes various sensors and detection devices.

In the exemplary embodiment, the context acquisition unit 4 is designed to detect environmental data in the surroundings of the vehicle, a camera and radar sensors being used. Objects, vehicles and other road users in the vicinity of vehicle 1 can be detected using the data from these sensors. A GPS sensor is also provided, by means of which the position of the vehicle 1 can be determined. The context acquisition unit 4 also has an interface to a Controller Area Network (CAN) bus of the vehicle 1, via which, for example, the speed and acceleration of the vehicle 1 and other vehicle data can be detected. Using another interface to a new mobile user device (not shown), the context detection unit 4 can access user data of a user, which in the exemplary embodiment comprise a contact database, a telecommunication system for text and voice communication and scheduling data. In other exemplary embodiments, other sensors can alternatively or additionally be used, for example lidar, ultrasound or devices for observing the vehicle interior, or interfaces to other devices can be provided, for example social networks, cloud services or other external services.

The display 2 is designed in a manner known per se and, in the exemplary embodiment, is integrated into the dashboard of the vehicle 1 as a center display. The display can be integrated in a touchscreen, in which a touch-sensitive surface is arranged over a display surface of the display 2 and inputs from a user can be detected.

Figure 2A:
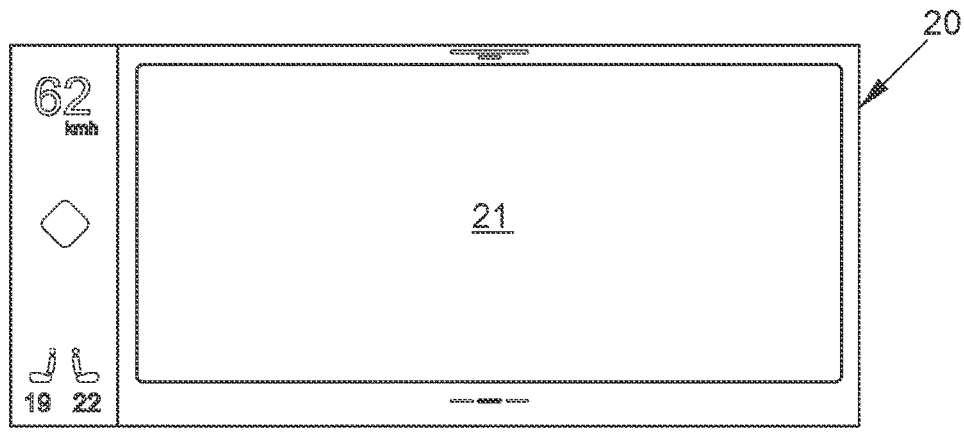
FIGS. 2A to 2C show exemplary embodiments of displays that can be generated by the operating system, under some aspects of the present disclosure.
Figure 2B:
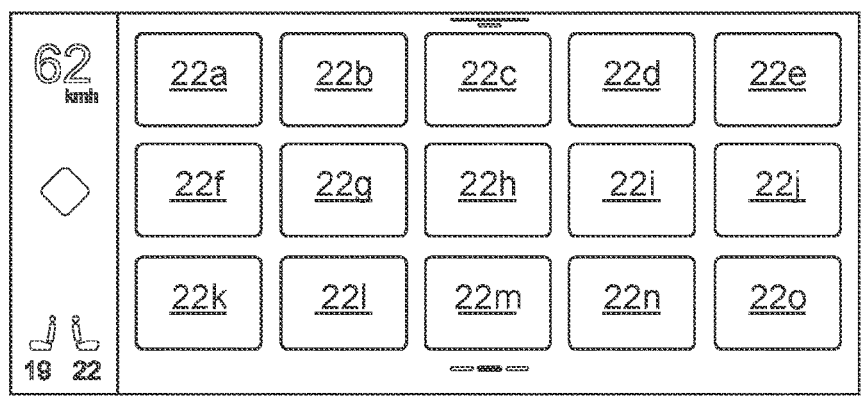
Figure 2C:
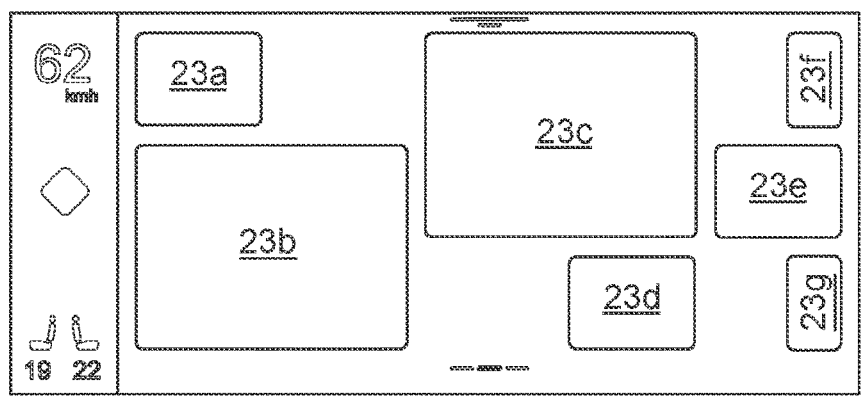

With reference to FIGS. 2A to 2C, exemplary embodiments of displays that can be generated by the operating system are explained. This is based on the exemplary embodiment of the operating system according to the invention explained above.

In the case shown in FIG. 2A, a graphical user interface 20 has a display area 21. This is a surface area formed within the user interface 20 and reserved for the output of thematically related information. In the exemplary embodiment, the display area 21 is designed as a widget 21, that is to say it comprises the output of data and the provision of operating options for an application program that is integrated into the graphical user interface 20. The widget 21 can relate, for example, to navigation, media playback, telecommunications and/or an application program for another task.

Furthermore, further display elements are provided within the graphical user interface 20, in particular an output of the current speed of the vehicle 1 as well as an output relating to the settings of a seat heater, which, however, will not be discussed further below. Despite these other elements within the user interface 20, the representation of a large display area in FIG. 2A is referred to as a "full-screen display" for the display area 21.

In the example shown in FIG. 2B, the graphical user interface 20 has a plurality of display areas 22a to 22o which are arranged in a matrix. Here, too, there are display areas 22a to 22o designed as widgets 22a to 22o. They can also be designed as program symbols which, when actuated, change to a full-screen display as in FIG. 2A, a respectively assigned application program being called up.

In the case shown in FIG. 2C, display areas 23a to 23g are distributed less regularly within the surface which, in the case shown in FIG. 2A, is occupied by the full-screen representation of display area 21. Here too, in the exemplary embodiment, the display areas 23a to 23g are designed as widgets 23a to 23g. It can be provided that, by actuating a widget 23a to 23g, a full image display as in FIG. 2A is produced for a respectively assigned application program.

In the example, it is provided that it is possible to switch between the representations shown in FIGS. 2A to 2C, in particular by means of an operating action that includes, for example, a swiping gesture, a rotation or a shifting of an operating element or another actuation. Furthermore, an operator element can be provided within the operator interface 20, the actuation of which can be used to switch between the different cases in FIGS. 2A to 2C.

An exemplary embodiment of the method according to the invention is explained on the basis of the exemplary embodiments of displays that can be generated by the operating system shown in FIGS. 3A to 3F. This is based on the exemplary embodiment of the operating system according to the invention explained above.

Figure 3A:
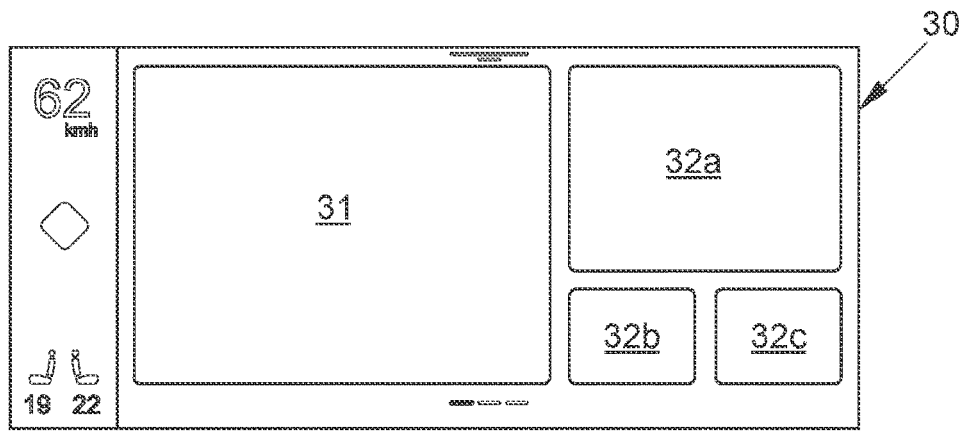
FIGS. 3A to 3F show other exemplary embodiments of displays that can be generated by the operating system, under some aspects of the present disclosure.

In the example shown in FIG. 3A, a graphical user interface 30 has a first display area 31 and three other display areas 32a to 32c. The other display areas 32a to 32c are arranged in the right area of the user interface 30 and are designed to be smaller in their extent than the first display area 31 in the left part of the user interface 30.

In the exemplary embodiment, a user can configure the contents and/or operating options displayed in the first display area 31 and in the further display areas 32a to 32c in a manner known per se. For example, an output from a navigation system is output in the first display area 31.

In the exemplary embodiment, a state may be defined as the basic state of the graphical user interface 30. Context data for the vehicle 1 are continuously detected by means of the context detection unit 4 and evaluated by the control unit 3. At the same time, a large number of info applications are carried out through which various data can be output and operating options can be provided. The info applications are carried out in particular in the vehicle 1, for example by means of a computing unit coupled to the control unit 3 or another device. In particular, info applications are carried out by a mobile user device that is coupled to the vehicle 1. Furthermore, info applications can be provided by facilities external to the vehicle, for example from an external server, in particular in the case of online services or cloud services. The info applications available can be formed, for example, depending on the identity of a user or depending the vehicle 1, for example when the info applications are coupled to a specific user of the system executing the info applications. For the various info applications, relevance values are determined on the basis of the context data detected, which indicate how relevant an instance of an info application is in the current context of the vehicle 1. For this purpose, in the exemplary embodiment, a series of predetermined weightings is used for various info applications, but the weightings can also be formed depending on the current context.

For example, a high relevance value may be determined for an info application through which an incoming call is output via a telecommunication system and the user can answer the call. An info application for outputting information about points of interest in a spatial environment of a route currently being traveled can then be rated with a high relevance value if the vehicle 1 is currently at a position in the vicinity of such a point of interest. Furthermore, info applications for outputting information about the activity of a driver assistance system or for detecting inputs from the user for a driver assistance system can be highly relevant if an activity of the driver assistance system for driving the vehicle 1 is assessed as necessary or useful in the current context.

In contrast, low relevance values can be determined, for example, when an info application relates to information about points of interest that are far from the current position of the vehicle 1.

In the exemplary embodiment, a relevance threshold value may be specified with which the relevance values for individual info applications are compared. If the relevance threshold value is exceeded, it is assumed that an info object is to be generated for the info application in order, for example, to display relevant information to the user and/or to enable him to operate in a relevant manner. If, on the other hand, the relevance threshold is not reached, it is assumed that the info application is not sufficiently relevant in the current context.

In other exemplary embodiments, the relevance threshold value can be formed dynamically as a function of the context. For example, a higher relevance threshold value is determined if the user, in particular the driver of vehicle 1, is seriously challenged in a current context, for example by a confusing traffic situation, and no displays with lesser relevance can be processed. That is, if a strenuous or difficult traffic situation in which the driver should not be disturbed is recognized on the basis of the current context data, the relevance threshold value is determined to be correspondingly high. Conversely, a lower relevance threshold value can be determined when the vehicle is stationary, when the relevant user is not the driver of the vehicle or when the vehicle is guided with the aid of at least partially automatic driver assistance systems.

Figure 3B:
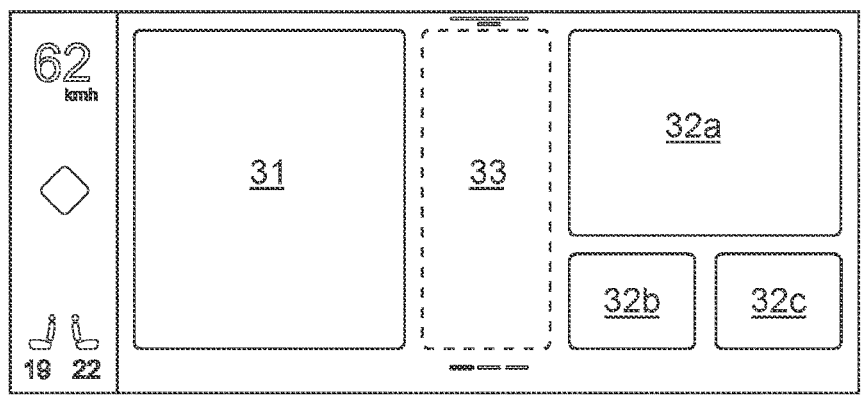

In the example shown in FIG. 3B, it was recognized that the relevance value for a specific info application exceeds the relevance threshold value in the current context. A graphical info object 34 assigned to the info application is therefore to be output, which is designed as a widget 34 for this info application. For this purpose, a reduction in the size of the first display area 31 is represented by shifting its right edge to the left. This creates a free surface in which an information area 33 is formed. In the exemplary embodiment, only the size of the first display area 31 changes, in other exemplary embodiments, however, the size of the other display areas 32a to 32c can alternatively or additionally be changed so that the information area 33 is created. Furthermore, in particular in addition to a reduction in size, a shift of the first 31 or the other display areas 32a to 32c can be displayed in order to produce the information area 33.

Figure 3C:
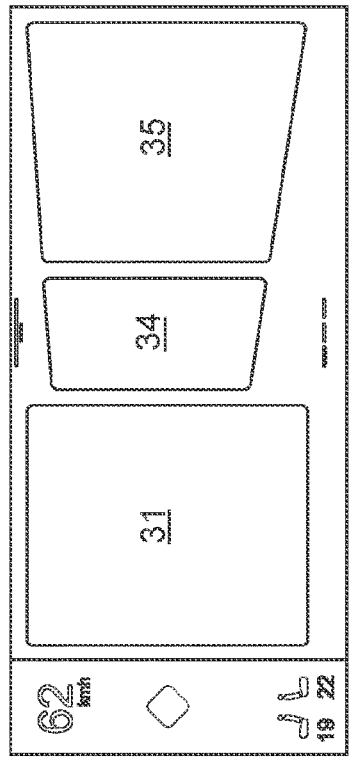

In the example shown in FIG. 3C, the info object 34 is shown in the info area 33, as shown in FIG. 3B. In particular, the information object 34 is displayed as a so-called feed card. The info object 34 is designed as a widget 34.

In the exemplary embodiment, it is provided that during the transition from the situations shown in FIG. 3B to the appearance of the info object 34 in FIG. 3C, an animated representation is generated in such a way that the first info object 34 "falls" into the info area 33 is represented. That is, the info object 34 moves from the upper edge of the info area 33 in a downward movement within the graphical user interface 33 before it comes to a stop approximately in the middle of the info area 33. In other exemplary embodiments, the info object 34 can appear in a different way, for example by being "pushed" into the info area 33 from a lateral direction, by fading it in or in some other way known per se.

In the exemplary embodiment it is further provided that the info object 34 may be displayed in such a way that an impression of a perspective representation is created so that the info object 34 appears tilted backwards in relation to the plane of a display area in which the graphical user interface 30 is displayed, which leads to a trapezoidal outline of the info object 34 in a projection onto the plane of the display surface. In contrast, the other display areas 31, 32a to 32c have essentially rectangular outlines.

In other exemplary embodiments, it can be provided that the info object 34 is also designed with a rectangular or other outline; furthermore, highlights formed in a manner known per se can be provided through which the info object 34 is highlighted as compared to the further display areas 31, 32a to 32c.

Figure 3D:
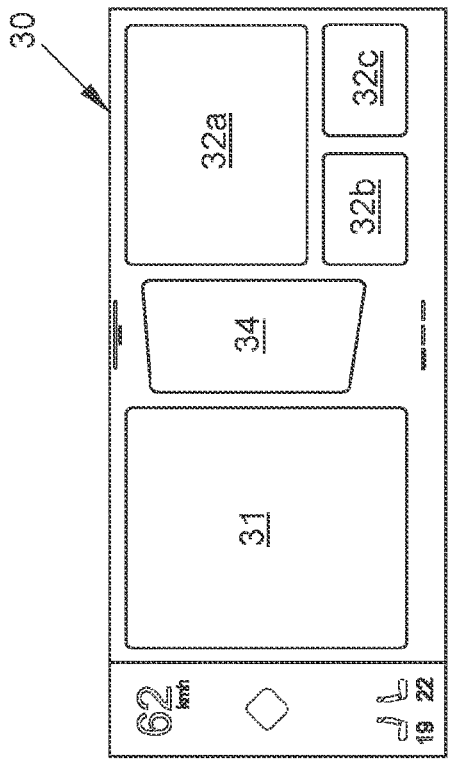

In the example shown in FIG. 3D, the graphical user interface 30 further includes an additional info object 35, in this case again a widget 35, which replaces the other display areas 32a to 32c in the right area of the graphical user interface 30. In the exemplary embodiment represented, this state was achieved by actuating the info object 34, with this actuation calling up a more comprehensive display of the assigned info application. In the exemplary embodiment, the info object 34 and the additional info object 35 are represented in perspective so that they represent two feed cards pivoted relative to the plane of the graphical user interface 30, the additional info object 35 representing an optical continuation of the info object 34, whereby a contextual relationship is also expressed.

Figure 3E:
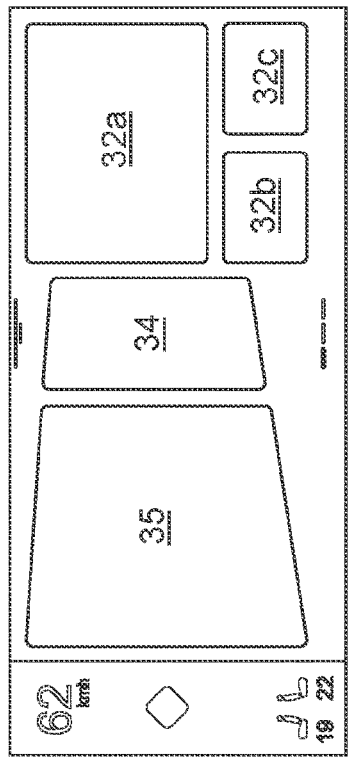
Figure 3F:
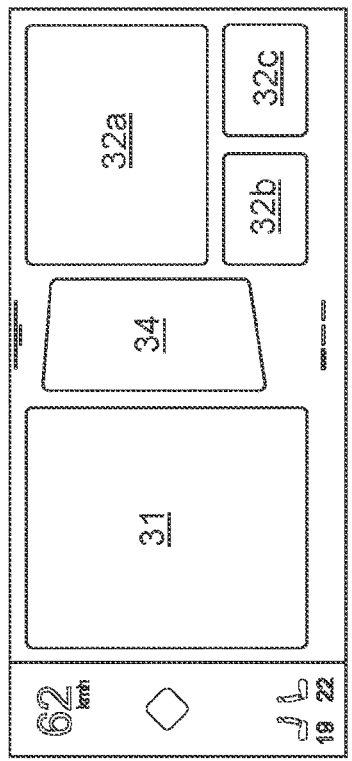

The cases shown in FIGS. 3E and 3F essentially correspond to the cases explained above with reference to FIGS. 3C and 3D. The additional info object 35, however, is formed in an area to the left of the info object 34 and replaces the first display area 31. The pivoting of the info object 34 shown in perspective relative to the plane of the graphical user interface 30 is correspondingly reversed.

In the exemplary embodiment, a decision is made as to whether the representations will be output analogous to FIGS. 3C and 3D, that is to say with an additional information object 35 in the right-hand area, or analogously to FIGS. 3E and 3F, that is to say with an additional information object 35 in the area to the left of the info object 34, in that the priorities of the contents output in the first display area 31 and in the further display areas 32a to 32c are determined in particular as a function of current context data. That is to say, it is determined which contents are currently of higher importance and which contents may be overlaid or displaced by the additional info object 35 at least temporarily. In other exemplary embodiments, a threshold value can also be defined and if it is exceeded, a content may not be covered or replaced by an additional info object 31, so that it cannot be displayed in particular if all display areas 31, 32a to 32c exceed the threshold value.

In other exemplary embodiments, the user can also use an operator action to determine on which side of the info object 34 the additional info object 35 is to be output, for example by means of a swiping gesture in the corresponding direction.

In another exemplary embodiment, the info object 35 can be output as a popup, in particular the representation of the graphical user interface 30 shown in FIG. 3A being at least partially covered. In other exemplary embodiments, the additional info object 35 can be output as a popup, in particular the representation of the graphical user interface 30 shown in FIG. 3C or 3E being at least partially covered.

Another exemplary embodiment may be explained on the basis of the exemplary embodiments of displays shown in FIGS. 4A to 4G which can be generated by the operating system. This is based on the exemplary embodiment of the operating system according to the present disclosure explained above. Furthermore, elements that are designed analogously to the displays explained above with reference to FIGS. 3A to 3F are not described again in detail.

Figure 4A:
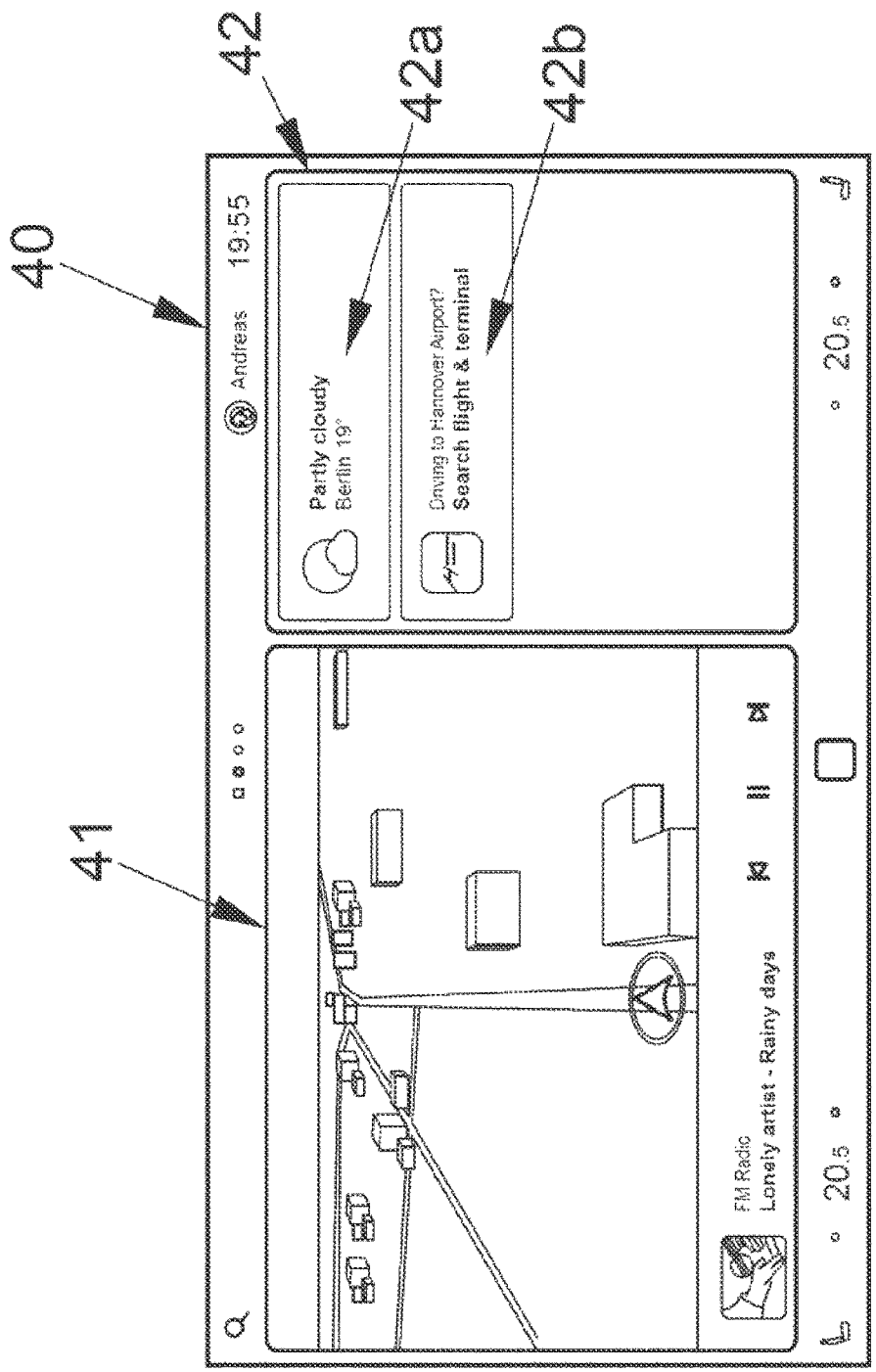

In the example shown in FIG. 4A, the graphical user interface 40 comprises a first display area 41 in which data from a navigation system and data from a media playback are output, and an info area 42, which is designed here as a widget 42.

In other exemplary embodiments, it can be provided that, similar to the displays explained above with reference to FIGS. 3A to 3F, the info area 42 is generated only when a relevance value has been determined for an info application that exceeds a specific relevance threshold; the first display area 41 can initially extend essentially over the entire width of the graphical user interface 40 and then be reduced in size to form the information area 42.

Info objects 42a to 42j, which are designed as sub-widgets 42a to 42j, are output in the info area 42. That is, they are subordinate to the widget 42, which represents the info area 42, and are output within the surface occupied by it. In the exemplary embodiment, the info objects 42a to 42j each include a graphical representation that is formed in particular as a function of the respectively assigned info application, so that the user can immediately recognize what type of information or operating option it is. They also include text elements. They can also be shown with a border and, if necessary, shading. Furthermore, by means of graphical representation methods known per se, it can be achieved that an info object 42a to 42j is highlighted or shown in the foreground with respect to other info objects 42a to 42j.

In the exemplary embodiment, similar to that already described above, relevance values are determined for a large number of info applications and compared with a relevance threshold value. When the relevance threshold value is exceeded, a corresponding info object 42a to 42j is output in the info area 42. The info objects 42a to 42j are displayed one below the other, their arrangement in a sequence and their size being established according to their relevance value. The higher the relevance value, the further up an info object 42a to 42j is output. In addition, information objects 42a to 42j recognized as being particularly relevant are represented enlarged and moved to the front.

The displays shown in FIGS. 4A to 4G represent an exemplary sequence of a display while the context of the vehicle 1 changes over time, among other things because the vehicle 1 is moving, because communication is being carried out, because the user is performing operating actions and because external data and notifications are received.

In the example shown in FIG. 4A, the context data detected include a current position of the vehicle 1 in a specific position, a route traveled in the direction of an airport and weather information provided by an external unit. The info area 42 here comprises a first info object 42a, with which information about the current weather in the current surroundings of the vehicle 1 is output, and a second info object 42b, which is assigned to an info application, by means of which an airport was recognized as a probable travel destination and the user is offered an operating option to call up information about flights arriving at the airport.

In the example shown in FIG. 4B, the info area 42 includes another info object 42c, which replaces the output of the weather data, since a higher relevance was determined for it. The further info object 42c outputs the content of a text message, the sender being shown with name and profile picture. Another info application evaluates the content of the text message, which includes the specification of a flight number, an indication of an imminent landing and an indication of a planned pick-up at the airport.

Figure 4C:
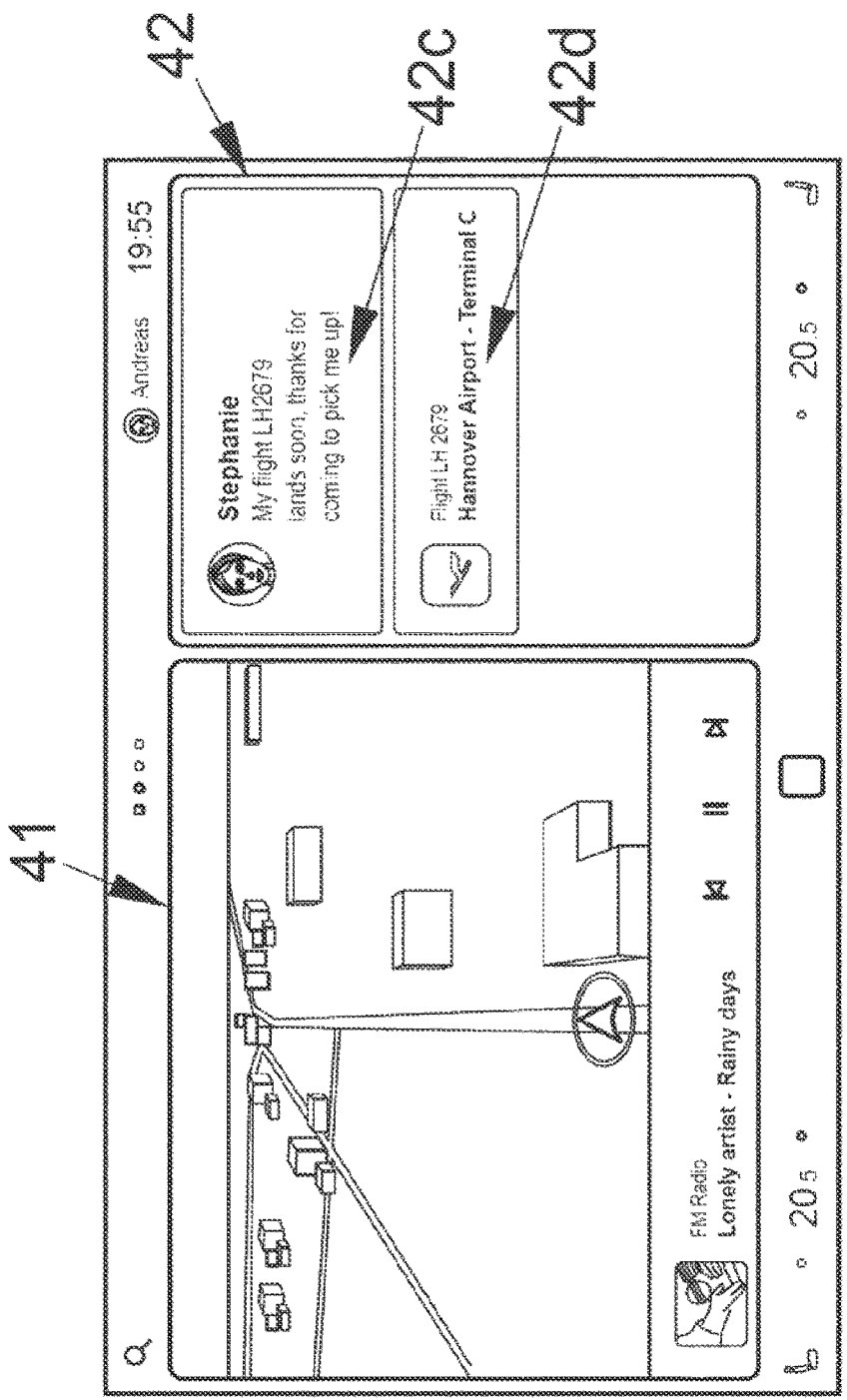

In the example shown in FIG. 4C, the info area 42 includes an info object 42d with information about the flight named in the text message, namely the destination airport and the terminal at which the flight arrives and where pick-up is possible. In this case, compared to the example shown in FIG. 4B, the info object 42b, through which the retrieval of flight data was offered, is replaced.

Figure 4D:
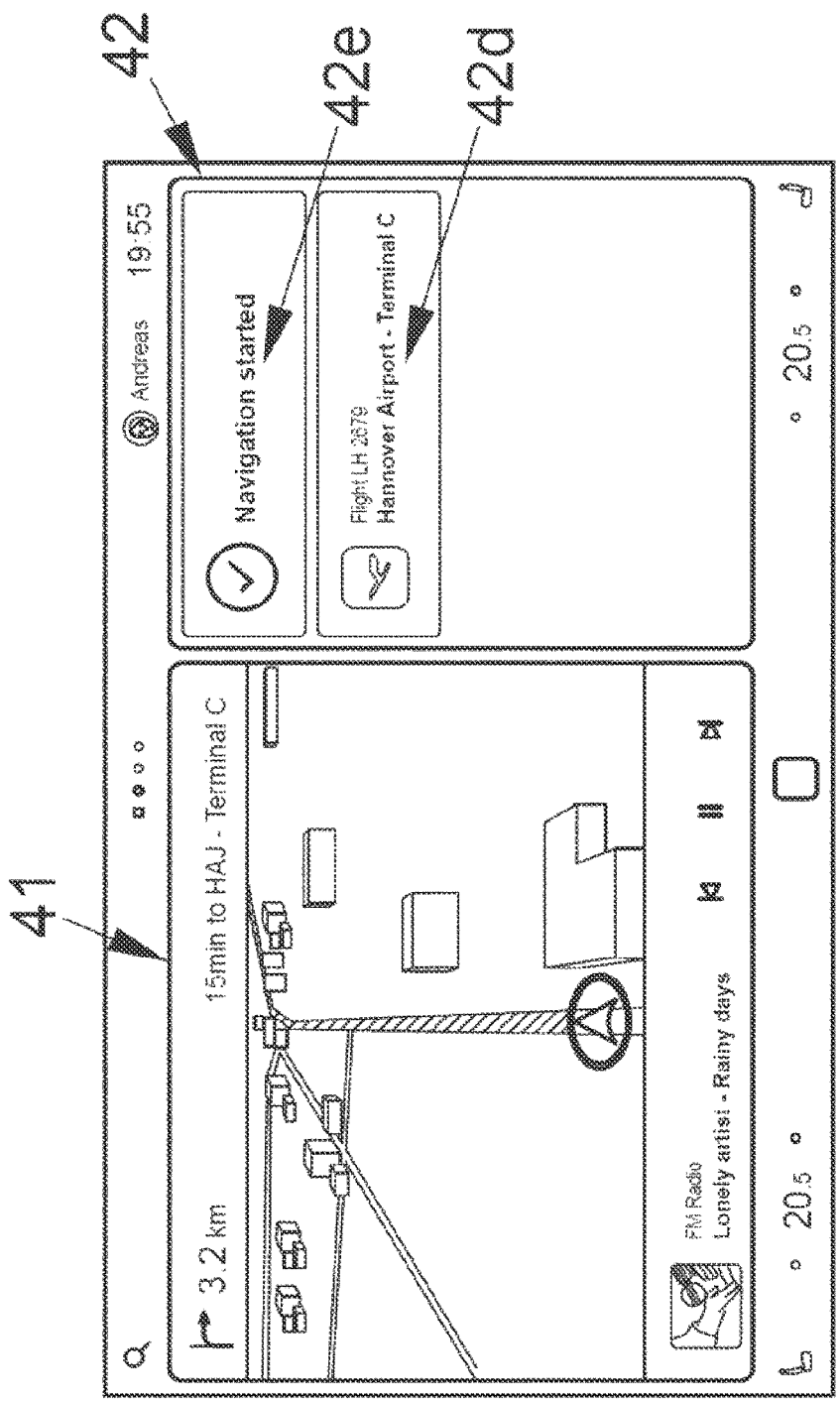

In the example shown in FIG. 4D, it is assumed that the user has started navigation to the airport, for example by actuating the info object 42d with information about the airport terminal. The route guidance is output in the first display area 41. The info area 42 here comprises a further info object 42e, which replaces the info object 42c with the output of the text message, confirming to the user that a navigation was started.

Figure 4E:
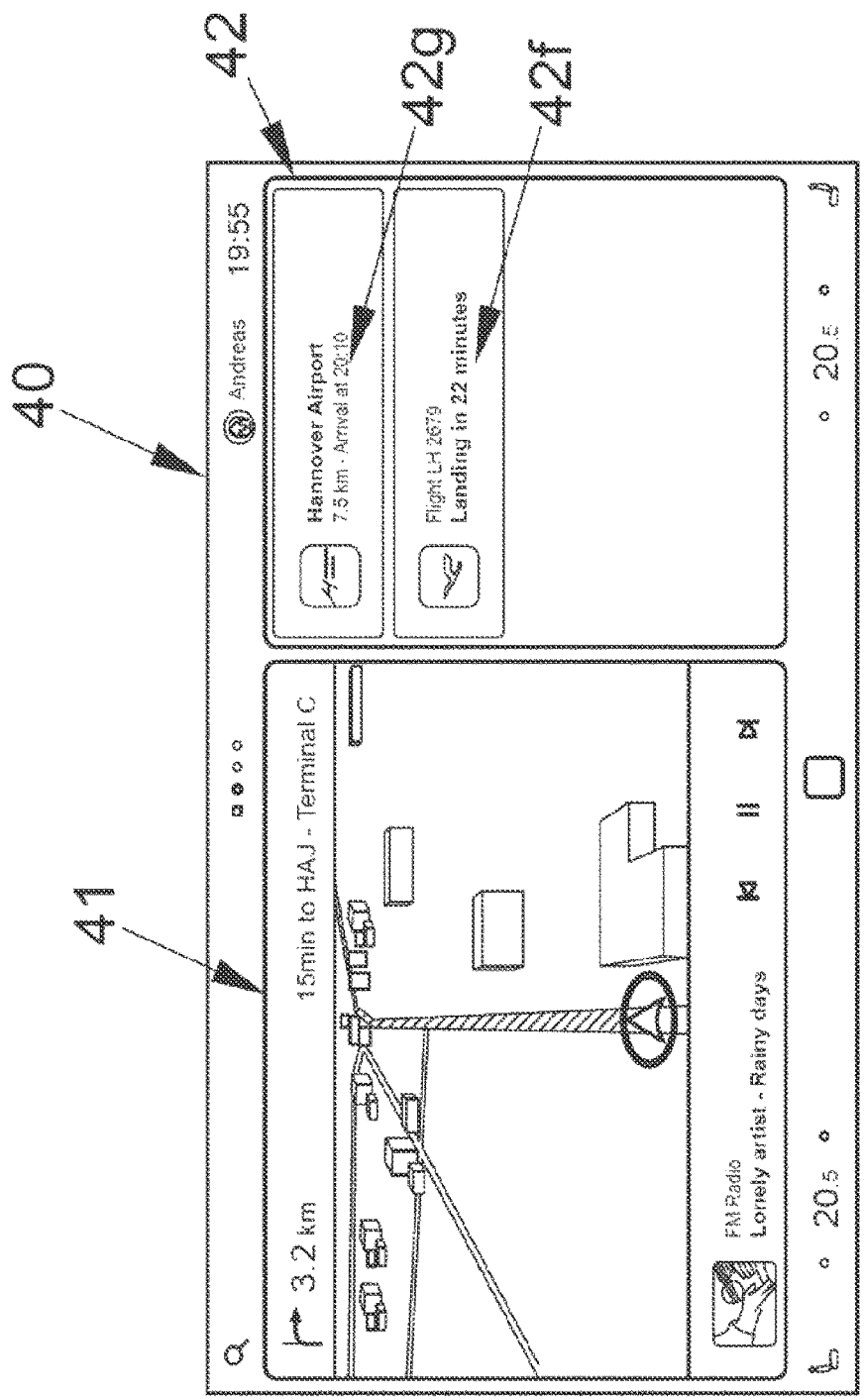

In the example shown in FIG. 4E, the navigation is continued and info objects 42f, 42g are output in the info area 42, which inform the user about the progress of the navigation or about the expected arrival time of the flight.

Figure 4F:
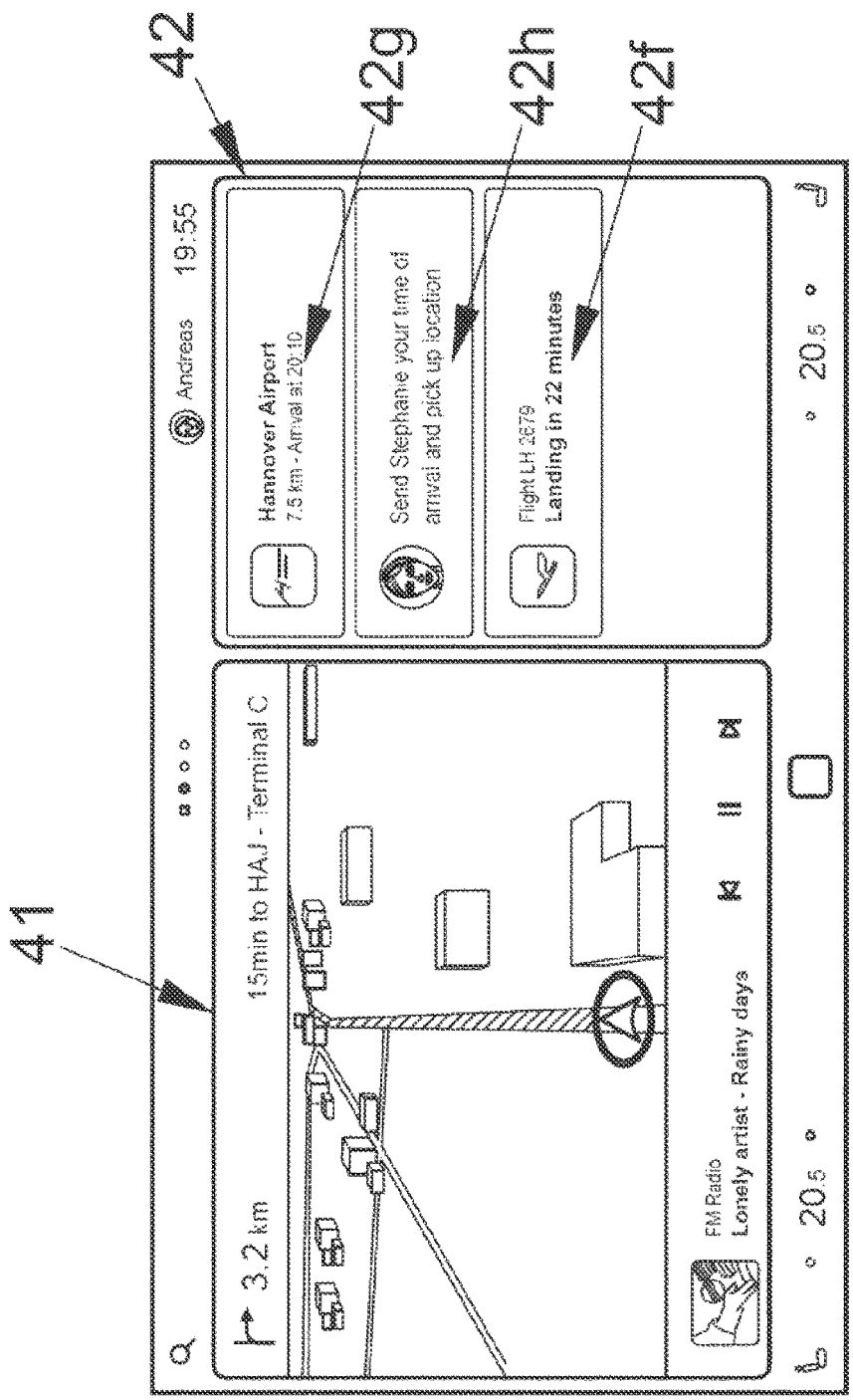

In the example shown in FIG. 4F, an automatic response option is offered with which the user can respond to the previously issued text message. For this purpose, an info object 42h is output which includes the information that the communication partner can be informed of an arrival time at the airport and a location for pick-up. In the exemplary embodiment, this info object 42h is arranged between the info object 42g, which relates to the navigation, and the info object 42f, which relates to the estimated time of arrival of the aircraft.

Figure 4G:
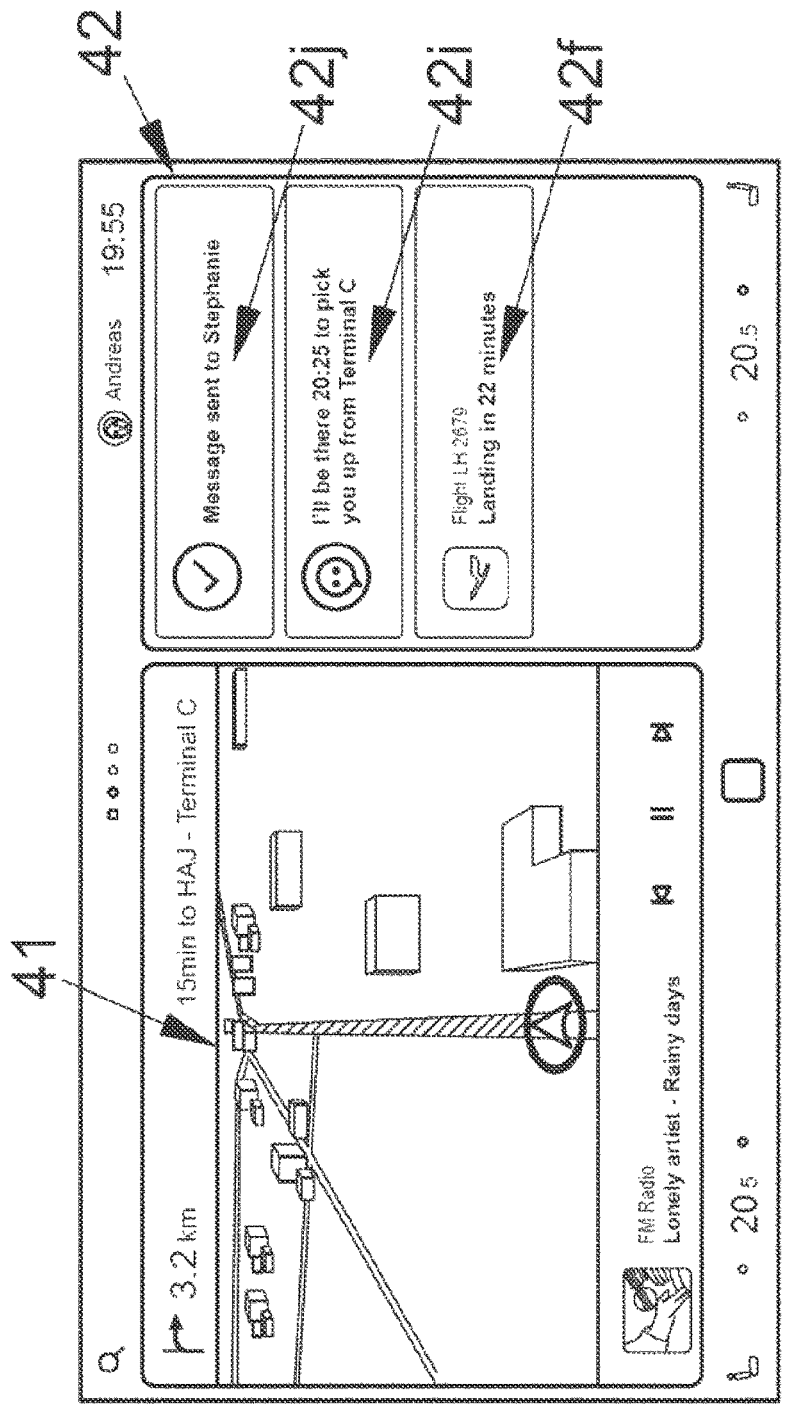

In the example shown in FIG. 4G, it is assumed that the user has consented to the sending of a corresponding message, for example by actuating the info object 42h for the automatic response option. An info object 42j is output which confirms the sending of the automatically generated response, as well as an info object 42i which reproduces the text of the automatic response.

In the case of transitions among different arrangements and configurations of the graphical info objects 42a to 42j, different representations can be output, in particular with an animated representation in which the output appears as a sequence of images. Individual info objects 42a to 42j can appear or disappear, in particular represented by a fading in and out.

Furthermore, an info object 42a to 42j can be highlighted, for example by means of known graphic representation options or by a change that appears spatially, in which, for example, an info object 42a to 42j is brought into the foreground, which can, for example, be represented by changing the size and/or shading Info objects 42a to 42j can also be rearranged, with their shifting relative to one another and relative to the info area 42 can be represented. Furthermore, the content of an info object 42a to 42j can be updated, the content within the info object 42a to 42j being changed and in particular replaced by new content.

Furthermore, interactions of a user with individual info objects 42a to 42j or with elements included thereby can be carried out. A detection unit is provided for this, for example a touch-sensitive surface of a touchscreen, through which the graphical user interface 40 is also output, or other types of detection. The interactions can include, for example, tapping or clicking on a graphical info object 42a to 42j, it being possible to differentiate between single or multiple tapping and tapping in various ways, such as left and right click, one finger or several fingers. Furthermore, a longer lasting touch, a so-called long press, can be detected and further operating options are provided, for example in the sense of a context menu or additional options. Furthermore, a swiping gesture or some other operation can be provided in order to discard a graphical info object 42a to 42j, for example by sliding it out of the info area 42, for example if the user evaluates a certain info object 42a to 42j as not relevant.

In further exemplary embodiments, it is also provided that info objects 42a to 42j that are no longer relevant or that are less relevant than other info objects 42a to 42j, are shown further below than more relevant info objects 42a to 42j within the info area 42. Over time, this leads to info objects 42a to 42j sliding down so far that they are pushed beyond the lower edge of info area 42 and are no longer visible. This means that a large number of info objects 42a to 42j can be displayed, although only a real subset is actually displayed. The arrangement of the multiplicity of info objects 42a to 42j corresponds to a history of the info objects 42a to 42j, since this means that info objects 42a to 42j previously shown are still included. In particular, the display of such info objects 42a to 42j that are no longer relevant is changed, for example by a grayed-out display. Less relevant or older info objects 42a to 42j can still be called up by an operator action, for example a swipe gesture in the area of info area 42, whereby the row of info objects 42a to 42j shown one below the other is shifted and a new subset is represented. Such operator actions can also be used to learn a user's preferences, for example by means of a machine learning method. The learned data can in turn be detected and taken into account as context data.

The graphical user interface 30, 40 represented in the exemplary embodiments enables information and/or operating options to be output on the basis of context data. These can relate, for example, to information about a learned behavior of a user, for example behavior in certain classified situations, when shopping, on the way to work or for refueling, picking up children or the like. Furthermore, a large amount of information can be taken into account, for example about a driving style, a communication style, for example by means of telephony or video or text messages, media consumption, leisure activities, a networked environment of the apartment (so-called smart home) as well as a current position and the stay in a defined environment, the type of the current trip, weather conditions, contact lists, if applicable passengers, a current traffic situation and a stress level of the driver, the trip time and distance, a load or the like. This multitude of information about the current context can be used to determine when certain information is to be communicated to the user and when operating options are to be offered. This takes place primarily when the user can also cognitively receive and process them, that is, when the driving situation and the context allow, for example, location-based services to be displayed.

Furthermore, the information that can be displayed can be prioritized on the basis of the relevance value in order to display relevant information particularly clearly, while other content is reduced in comparison, up to and including the complete hiding of irrelevant information units and displays.

This makes it possible to determine when the user is to be offered certain information and operating options, for example relating to services and offers. In this way, for example, advertising content can be output in such a way that it corresponds to the actual interest of the user in a certain context and can be easily grasped by him.

In contrast to known methods, the present disclosure focuses on the management of the info objects as a function of their relevance. Content and additional objects can be displayed within the graphical user interface in order to display messages, information and services. In particular, a special display tile within the graphical user interface, which is designed in particular as an information area, serves as a display container for displaying the content.

The info objects have a particularly flexible operating depth, which can be designed as desired by adjusting the size, arrangement and content, from simply triggering an action, for example by pressing or tapping, to operating a service and a complex range of functions.

The information area can also be formed in a central area of the graphical user interface in order to be able to offer a particularly suitable display area for information objects.

The information area can serve as a platform that is managed by a system provider, for example. This means that relevant issues from other providers, such as advertising partners or service providers, can be easily integrated into the operating system. The number of services that can be offered according to their relevance can thus be expanded considerably.

Furthermore, a fixed format for content can be provided within the info objects, whereby in particular a separate color and design scheme, a so-called corporate design, can be achieved for the operating system. Third-party providers can display their offers, applications or apps in their own corporate design (look & feel) in the info area.

The information area can also be designed as a central display area of the graphical user interface, in which relevant functional, operating and information options are provided. In addition, a navigation map can be output, for example, if this is relevant. The info area can thus serve as a collective container for content that is dependent on a current context and situation. The scope of services can be expanded dynamically without a large number of individual info applications having to be integrated and operated. An intelligent, context-sensitive operating system is made possible, which leads to a considerable simplification of the operation.

In further exemplary embodiments, voice control can take place, in which case the overall visual scope of the graphical user interface can advantageously be reduced.

In addition, information and operating options from mobile devices can be integrated within the graphical user interface so that a central operating unit is provided. The relevant information is received via interfaces and control signals, for example when the user is operating, are transmitted.

The operating system is very open to new applications and is highly scalable. New functions and info applications can easily be integrated in order to accompany the journey with the vehicle in a scenario and context-dependent manner.

LIST OF REFERENCE NUMERALS 1 vehicle
2 output unit; display
3 control unit
4 context detection unit
20 graphical user interface
21 display area, widget
22a to 22o display area, widget
23a to 23g display area, widget
30 graphical user interface
31 first display area
32a to 32c second display area
33 info area
34 graphical info object, widget
35 additional info object, widget
40 graphical user interface
41 first display area
42 info area; widget
42a to 42j info object; sub-widget

The invention claimed is:

1. A method for operating a control system in a vehicle, in which display data of a graphical user interface with a first display area and an information area are generated and outputted, comprising:
detecting and updating context data in real-time, in response to changes in a current context of the vehicle;
determining a first relevance value for a first information application based on the updated context data;
generating a graphic info object based on the first info application, if the first relevance value exceeds a relevance threshold value, and outputting the generated graphic info object in the information area; and
configuring an arrangement and/or size of the graphic info object as a function of the first relevance value; and
outputting the configured arrangement and/or size of the graphic info object in the information area.

2. The method according to claim 1, wherein the detected context data comprises one or more of (i) features of the vehicle, (ii) an operating state of the vehicle, (iii) a trip by a user with the vehicle, and/or (iv) user data of the user.

3. The method according to claim 1, wherein the first display area and the information area are configured as windows or widgets within the graphical user interface.

4. The method according to claim 3, wherein the graphic info object is configured as a sub-widget or sub-window that is subordinate to the information area.

5. The method according to claim 1, wherein the graphic info object relates to an incoming message from a telecommunication system and comprises at least one selectable automatic response option.

6. The method according to claim 1, wherein the graphic info object relates to an appointment collision and comprises at least one selectable automatic notification option.

7. The method according to claim 1, wherein, when outputting the graphic info object in the information area, an image sequence is generated so that a shifting of the graphic info object is represented.

8. The method according to claim 1, further comprising outputting at least one further graphic info object in the info area, wherein the first and the further graphic info object are arranged in an order determined by their respective relevance value.

9. The method according to claim 8, wherein the first or second graphic info object is arranged so that a subset of the info object is displayed in the info area, and wherein the displayed subset of the info objects is modifiable by an operator action.

10. A control system for a vehicle, comprising
a control unit comprising a display, the control unit being configured to generate and output display data on a graphical user interface with a first display area and an information area; and
a context acquisition unit comprising at least one sensor, the context acquisition unit being configured to detect and update context data in real-time, in response to changes in a current context of the vehicle, wherein the control unit is configured to
determine a first relevance value for a first information application based on the updated context data;
generate a graphic info object based on the first info application, if the first relevance value exceeds a relevance threshold value, and output the graphic info object in the information area;
configure an arrangement and/or size of the graphic info object as a function of the first relevance value; and
output the configured arrangement and/or size of the graphic info object in the information area via the display.

11. The control system according to claim 10, wherein the detected context data comprises one or more of (i) features of the vehicle, (ii) an operating state of the vehicle, (iii) a trip by a user with the vehicle, and/or (iv) user data of the user.

12. The control system according to claim 10, wherein the first display area and the information area are configured as windows or widgets within the graphical user interface.

13. The control system according to claim 12, wherein the graphic info object is configured as a sub-widget or sub-window that is subordinate to the information area.

14. The control system according to claim 10, wherein the graphic info object relates to an incoming message from a telecommunication system and comprises at least one selectable automatic response option.

15. The control system according to claim 10, wherein the graphic info object relates to an appointment collision and comprises at least one selectable automatic notification option.

16. The control system according to claim 10, wherein, when outputting the graphic info object in the information area, the control unit is configured to generate an image sequence so that a shifting of the graphic info object is represented.

17. The control system according to claim 10, wherein the control unit is configured to output at least one further graphic info object in the information area, wherein the first and the further graphic info object are arranged in an order determined by their respective relevance value.

18. The control system according to claim 17, wherein the first or second graphic info object is arranged so that a subset of the info object is displayed in the information area, and wherein the displayed subset of the info objects is modifiable by an operator action.

19. A method for operating a control system in a vehicle, in which display data of a graphical user interface with a first display area and an information area are generated and outputted, comprising:
detecting and updating context data in real-time, in response to changes in a current context of the vehicle, the context data comprising one or more of (i) features of the vehicle, (ii) an operating state of the vehicle, (iii) a trip by a user with the vehicle, and/or (iv) user data of the user;

determining a first relevance value for a first information application based on the detected context data;

generating a graphic info object based on the first info application, if the first relevance value exceeds a relevance threshold value, and outputting the generated graphic info object in the information area, as a sub-widget or sub-window that is subordinate to the information area; and configuring an arrangement and/or size of the graphic info object as a function of the first relevance value; and outputting the configured arrangement and/or size of the graphic info object in the information area.

20. The method according to claim 19, further comprising outputting at least one further graphic info object in the info area, wherein the first and the further graphic info object are arranged in an order determined by their respective relevance value.

* * * * *